United States Patent
Lee

(10) Patent No.: US 12,441,403 B2
(45) Date of Patent: Oct. 14, 2025

(54) STEERING CONTROL DEVICE AND METHOD OF VEHICLE

(71) Applicant: HL MANDO CORPORATION, Gyeonggi-do (KR)

(72) Inventor: KwangHyung Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 142 days.

(21) Appl. No.: 18/086,617

(22) Filed: Dec. 21, 2022

(65) Prior Publication Data

US 2023/0202562 A1    Jun. 29, 2023

(30) Foreign Application Priority Data

Dec. 23, 2021    (KR) .................. 10-2021-0186339

(51) Int. Cl.
| | | |
|---|---|---|
| *B62D 15/02* | (2006.01) | |
| *B62D 5/00* | (2006.01) | |
| *B62D 5/04* | (2006.01) | |
| *B62D 6/00* | (2006.01) | |

(52) U.S. Cl.
CPC ......... *B62D 15/0245* (2013.01); *B62D 5/001* (2013.01); *B62D 5/0463* (2013.01); *B62D 5/0481* (2013.01); *B62D 5/0484* (2013.01); *B62D 6/002* (2013.01);
(Continued)

(58) Field of Classification Search
None
See application file for complete search history.

(56) References Cited

U.S. PATENT DOCUMENTS

| | | | | |
|---|---|---|---|---|
| 8,515,621 B2* | 8/2013 | Hestermeyer | ........ | B62D 5/0493 701/41 |
| 9,096,256 B2* | 8/2015 | Jang | ..................... | B62D 5/0481 |
| 11,021,185 B2* | 6/2021 | Kim | .................. | B62D 15/0235 |

(Continued)

FOREIGN PATENT DOCUMENTS

| | | |
|---|---|---|
| JP | 2003-315096 | 11/2003 |
| KR | 2003-0016609 | 3/2003 |

(Continued)

OTHER PUBLICATIONS

Notice of Allowance dated Aug. 26, 2025 for Korean Patent Application No. 10-2021-0186339 and its English translation from Global Dossier.

*Primary Examiner* — Kevin R Steckbauer
(74) *Attorney, Agent, or Firm* — WOMBLE BOND DICKINSON (US) LLP

(57) ABSTRACT

The embodiments relate to a steering control device and method of a vehicle. A steering control device may include a receiver configured to receive absolute steering angle information, relative steering angle information, and rack position information of the vehicle, a determiner configured to determine absolute steering angle estimation information based on the rack position information and the relative steering angle information if there is an abnormality in the absolute steering angle information, and a controller configured to, if an adjustment condition is satisfied for at least one of a rack limit position and a steering wheel limit position, perform a position adjustment control based on the rack position information and the absolute steering angle estimation information.

17 Claims, 10 Drawing Sheets

(52) U.S. Cl.
CPC ....... *B62D 15/0235* (2013.01); *B62D 15/024* (2013.01); *B62D 5/049* (2013.01)

(56) References Cited

U.S. PATENT DOCUMENTS

| | | | | |
|---|---|---|---|---|
| 11,052,940 | B1* | 7/2021 | Narasimhan | B62D 6/008 |
| 11,267,504 | B2* | 3/2022 | Hong | B62D 5/005 |
| 11,479,293 | B2* | 10/2022 | Narasimhan | B62D 5/0484 |
| 11,492,039 | B2* | 11/2022 | Narasimhan | B62D 5/001 |
| 11,753,068 | B2* | 9/2023 | Kitazume | B62D 15/0245 |
| | | | | 180/446 |
| 11,834,110 | B2* | 12/2023 | Narasimhan | B62D 6/002 |
| 2014/0052331 | A1* | 2/2014 | Jang | B62D 5/0481 |
| | | | | 701/34.4 |
| 2019/0077444 | A1* | 3/2019 | Kim | B62D 15/0225 |
| 2020/0023892 | A1* | 1/2020 | Hong | B62D 5/0469 |
| 2022/0234648 | A1* | 7/2022 | Park | B62D 5/0481 |
| 2022/0242482 | A1* | 8/2022 | Kim | B62D 5/0463 |
| 2022/0289279 | A1* | 9/2022 | Narasimhan | B62D 5/0484 |
| 2023/0058697 | A1* | 2/2023 | Park | B62D 15/0245 |
| 2023/0100164 | A1* | 3/2023 | Sun | B62D 5/0484 |
| | | | | 701/41 |
| 2023/0117916 | A1* | 4/2023 | Kitazume | B62D 5/0469 |
| | | | | 180/446 |
| 2023/0202562 | A1* | 6/2023 | Lee | B62D 6/002 |
| | | | | 701/41 |
| 2023/0365186 | A1* | 11/2023 | Narayan | B62D 5/0457 |
| 2023/0391394 | A1* | 12/2023 | Narasimhan | B62D 6/008 |
| 2024/0051601 | A1* | 2/2024 | Lee | B62D 5/0469 |

FOREIGN PATENT DOCUMENTS

| | | | | |
|---|---|---|---|---|
| KR | 10-2004-0001375 | | 1/2004 | |
| KR | 10-2005-0040206 | | 5/2005 | |
| KR | 10-2009-0042074 | | 4/2009 | |
| KR | 20240114170 A | * | 7/2024 | ........... B62D 5/0421 |

* cited by examiner

STEERING CONTROL DEVICE AND METHOD OF VEHICLE

CROSS REFERENCE TO RELATED APPLICATION

This application claims priority from Korean Patent Application No. 10-2021-0186339, filed on Dec. 23, 2021, which is hereby incorporated by reference for all purposes as if fully set forth herein.

TECHNICAL FIELD

Embodiments of the present disclosure relate to a steering control device and method of a vehicle, and more particularly, to a steering control device and control method of a vehicle for determining steering angle and performing position adjustment control.

If an error occurs in a steering angle sensor or a sensing signal thereof in a steering device of a vehicle, there may arise a problem in measuring a steering angle, and thus cause a difficulty in subsequent steering control.

In this case, it is difficult to perform steering assist control in the electric power steering device. Specifically, in the steer-by-wire steering device, there may occur a situation in which it becomes difficult to perform the steering control itself.

In addition, even if steering control is performed by indirectly estimating the steering angle in order to solve the above problem, there is a problem that the steering wheel and the rack are not in a position corresponding to each other during the subsequent vehicle use process, which may cause an error.

SUMMARY

In this background, embodiments of the present disclosure is to provide a steering control device and method for a vehicle capable of performing steering control by estimating a steering angle even if an error occurs in steering angle information.

In addition, the present disclosure is to provide a steering control device and method for a vehicle capable of reducing errors caused by the steering wheel and rack not being in a position corresponding to each other In an aspect of the present disclosure, there is provided a steering control device of a vehicle including a receiver configured to receive absolute steering angle information, relative steering angle information, and rack position information of the vehicle, a determiner configured to determine absolute steering angle estimation information based on the rack position information and the relative steering angle information if there is an abnormality in the absolute steering angle information, and a controller configured to, if an adjustment condition is satisfied for at least one of a rack limit position and a steering wheel limit position, perform a position adjustment control based on the rack position information and the absolute steering angle estimation information.

In another aspect of the present disclosure, there is provided a steering control method of a vehicle including receiving absolute steering angle information, relative steering angle information, and rack position information of the vehicle, determining absolute steering angle estimation information based on the rack position information and the relative steering angle information if there is an abnormality in the absolute steering angle information, and performing, if an adjustment condition is satisfied for at least one of a rack limit position and a steering wheel limit position, a position adjustment control based on the rack position information and the absolute steering angle estimation information.

According to embodiments of the present disclosure, it is possible to provide a vehicle steering control device and method capable of performing steering control by estimating a steering angle even if an error occurs in steering angle information.

According to embodiments of the present disclosure, it is possible to provide a vehicle steering control device and method capable of reducing errors caused by the steering wheel and rack not being in a position corresponding to each other

DETAILED DESCRIPTION

Figure 1:
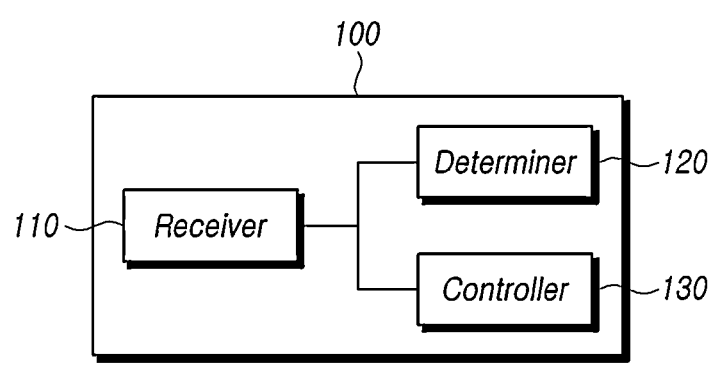
FIG. 1 is a block diagram of a steering control device of a vehicle according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A steering device for a vehicle according to the present disclosure may include a steering feedback actuator (SFA) which allows steering reaction force to act by feedback on the force applied to the steering wheel, and a road wheel actuator (RWA) which causes steering force to act on the wheels.

In addition, the steering device of a vehicle according to the present disclosure may include a steering device of a steer-by-wire method, and in this case, the steering of the vehicle can be performed by transmitting an electronic signal even if there is no mechanical connection between the steering feedback actuator and the road wheel actuator.

In addition, the position adjustment control referred to in the present disclosure may also be expressed in terms of alignment, synchronization, and the like.

FIG. 1 is a block diagram of a steering control device of a vehicle according to the present disclosure.

Referring to FIG. 1, a vehicle steering control device 100 according to the present disclosure may include a receiver 110, a determiner 120 and a controller 130. In addition, the receiver 110, the determiner 120, and the controller 130 may be connected to each other.

For example, the vehicle steering control device 100 may include the receiver 110 for receiving absolute steering angle information, relative steering angle information, and rack position information of the vehicle. The vehicle steering control device 100 may include the determiner 120 for determining absolute steering angle estimation information based on the rack position information and the relative steering angle information if there is an abnormality in the absolute steering angle information, and the controller 130 for performing a position adjustment control based on the rack position information and the absolute steering angle estimation information if an adjustment condition is satisfied for at least one of a rack limit position and a steering wheel limit position.

The receiver 110 may be connected to a sensor device or other device in the vehicle, and may receive information from the sensor device or other device in the vehicle. The receiver 110 may receive information at any time or at a regular period. The information received by the receiver 110 may include absolute steering angle information, relative steering angle information, rack position information, limit position indication information, and the like.

The absolute steering angle information refers to absolute angle information regarding a position within a physical driving range of a steering wheel, and may be received based on a sensing signal of a steering angle sensor.

Meanwhile, if it is determined that there is an abnormality in the absolute steering angle information, absolute steering angle estimation information may be calculated using the other sensor information generated based on a sensing signal of another sensor. In addition, the other sensor information may also be received using the receiver unit 110.

Here, the other sensor information may include at least one of steering motor position information received from the steering motor position sensor, steering torque information received from the steering torque sensor, drive motor position information received from the drive motor position sensor, and rack position information received from rack position sensor or drive motor position sensor. In addition, any information that can be used for estimating absolute steering angle information may be included.

For example, if the steering angle sensor and the sensing signal thereof are normal, absolute steering angle estimation information may be determined based on the sensing signal of the steering angle sensor.

On the other hand, if it is determined that an error has occurred in the steering angle sensor or its sensing signal, there may occur a problem such as a measurement failure or an error in measuring the absolute steering angle. In this case, absolute steering angle estimation information may be determined based on other sensor information such as steering motor position information and steering torque information, rack position information and drive motor position information.

The determination of the absolute steering angle estimation information will be described in more detail in the section on the determiner 120 below.

The relative steering angle information refers to relative angle information about a current position of a steering wheel, and may be determined based on a sensing signal of a steering angle sensor. In addition, relative steering angle information may be determined using other sensor information.

For example, if the steering angle sensor is a product which determines an absolute steering angle using two relative steering angle sensors, the relative steering angle may be determined based on a sensing signal of one relative steering angle sensor of the steering angle sensor. Alternatively, based on the steering motor position information or steering torque information, the relative steering angle information may be determined in a manner such as estimating the relative steering angle of the steering wheel using a change in the steering motor position or estimating the relative steering angle of the steering wheel using a change in magnitude of steering torque.

The rack position information refers to information about a position within the physical driving range of a rack, and may be measured by installing a separate sensor in the movable part of the rack, or may be determined using received drive motor position information and related gear ratio information.

The limit position indication information refers to information on whether each preset limit position has been reached toward both ends of the steering wheel or rack. The limit position indication information may be received from a limit position indicator (Lock Indicator) installed on at least one of a steering wheel or a rack.

Here, the limit position may be set to both ends within the physical driving range of the steering wheel or rack or to a position separated by a predetermined distance from each end. The limit position may include a steering wheel limit position set for the steering wheel and a rack limit position set for the rack.

In this case, the limit position indication information may be one of the steering wheel limit position indication information received from the steering wheel limit position indicator installed on the steering wheel and the rack limit position indication information received from the rack limit position indicator installed on the rack.

Here, the limit position indicator may include any devices including a configuration for determining whether the steering wheel or rack has reached the limit position and a configuration for indicating the determination result.

As an example, the steering wheel limit position indicator may be a switch installed at a position corresponding to the steering wheel limit position in the rotating shaft of the steering wheel. In this case, when the steering wheel reaches the limit position, the steering wheel limit position indication information may be generated using an electric signal generated by pressing a switch.

As another example, the steering wheel limit position indicator may generate steering wheel limit position indication information by determining that the steering wheel limit position has been reached if it is determined that the steering torque information is equal to or greater than a preset threshold torque. In this case, the steering torque information may be received from a steering torque sensor for detecting the steering torque by measuring a torsion degree of a torsion bar.

In this case, the threshold torque may be set to a torque amount which satisfies the condition of having a magnitude that is difficult to occur by a general steering operation and a magnitude that can be generated if a force is applied at a steering wheel limit position.

In addition, the limit position indicator may be installed to have a corresponding function not only at the steering wheel limit position but also at the rack limit position.

The determiner 120 may be connected to at least one of the receiver 110 and the controller 130. In this case, the determiner 120 may determine new information based on the information received from the receiver 110, or may re-determine the determined information using other information or a preset value. In addition, the determined information may be provided to the controller 130.

For example, the determiner 120 may determine the absolute steering angle estimation information based on the rack position information and the relative steering angle information. In this case, the absolute steering angle estimation information may be determined if it is determined that there is an abnormality in the absolute steering angle information received from the receiver 110.

Specifically, the determiner 120 may determine the position of the steering wheel corresponding to the rack position based on the rack position information. In this case, the position of the steering wheel may be determined, based on an inverse kinematics algorithm, a delta angle calculation, and the like, through calculation using the rack position as an input and the steering wheel position as an output.

After the position of the steering wheel is determined, the determiner 120 may determine section estimation information and relative steering angle estimation information corresponding to the steering wheel position corresponding to the rack position using the steering wheel position determination result.

Further, if the relative steering angle information and the relative steering angle estimation information are compared and the difference is greater than a preset tolerance, absolute steering angle information may be determined using the section estimation information and the relative steering angle estimation information.

That is, the determiner 120 may determine the absolute steering angle estimation information using the rack position information, or may determine the absolute steering angle estimation information using the rack position information and the relative steering angle information.

As another example, the determiner 120 may re-determine the absolute steering angle estimation information. In addition, in some cases, the absolute steering angle estimation information may be re-determined if a preset re-determination condition is satisfied.

For example, a condition indicating that the absolute steering angle estimation information corresponds to the steering wheel limit position, but the steering wheel limit position indication information does not correspond to the steering wheel limit position may be set as the re-determination condition. That is, the re-determination condition may include both a first condition in which the position of the steering wheel determined based on the absolute steering angle estimation information corresponds to the steering wheel limit position, and a second condition that the steering wheel limit position indication information indicates that the steering wheel is not at the steering wheel limit position. In this case, re-determination of the absolute steering angle estimation information may be performed within a range not exceeding the steering wheel limit position.

In this case, as long as the steering wheel limit position indication information is normal, since the actual steering wheel position has not reached the steering wheel limit position, there may be determined that an error has occurred in the determination result of the absolute steering angle estimation information.

In this situation, if it is determined that the steering wheel is moving in the direction of the steering wheel limit position, absolute steering angle estimation information may be re-determined in such a way that the absolute steering angle estimation information is maintained as a value corresponding to the steering wheel limit position.

In this regard, if it is determined that the absolute steering angle estimation information corresponds to the steering wheel limit position, but the steering wheel limit position indication information indicates does not correspond to the steering wheel limit position, the controller 130 may perform position adjustment control to move the steering wheel in the direction of the steering wheel limit position. In addition, control of moving the rack in the direction of the rack limit position can be performed simultaneously with the steering wheel moving control.

In this case, the moving speeds of the steering wheel and the rack may be determined based on steering torque information, or may be set to values corresponding to preset position adjustment speeds, respectively. For example, the position adjustment speed may be set as a value obtained by measuring a moving speed based on a specific time when the steering wheel reaches the steering wheel limit position.

Meanwhile, the above absolute steering angle estimation information redetermination and steering wheel position adjustment control may be performed when it is determined that steering force or steering torque acts on the steering wheel in the direction of the steering wheel limit position.

As another example, the determiner 120 may determine relative steering angle information. In this case, the relative steering angle information may be determined based on information received from a steering angle sensor, or may be determined based on at least one of steering motor position information received from a steering motor position sensor and steering torque information received from a steering torque sensor.

As a more specific example, the relative steering angle information may be determined by extracting a part related to the relative steering angle from absolute steering angle information if it is determined that there is no abnormality in the steering angle sensor or the sensing signal thereof.

On the other hand, if it is determined that there is an abnormality in the steering angle sensor or the sensing signal thereof, the relative steering angle information may be determined by a method of calculating the position or displacement of the steering wheel corresponding to the position or position change of the steering motor using the steering motor position information, or a method of calculating the position or the displacement of the steering wheel corresponding to the magnitude or change in magnitude of the steering torque using steering torque information.

As another example, the determiner 120 may determine steering angular velocity information. In this case, the steering angle velocity information may be determined by calculating a steering angle change rate based on the steering angle information. Here, the steering angle information used to calculate the steering angle velocity information may include one or more of absolute steering angle information and relative steering angle information.

As a more specific example, if it is determined that there is no abnormality in the steering angle sensor or the sensing signal thereof, steering angle velocity information may be determined based on absolute steering angle information.

On the other hand, if it is determined that there is an abnormality in the steering angle sensor or the sensing signal thereof, steering angular velocity information may be determined based on relative steering angle information. In this case, the relative steering angle information may be information determined based on steering motor position information or steering torque information.

As another example, the determiner 120 may determine a magnitude comparison result between steering angular velocity information and a preset reference angular velocity. As a result of the magnitude comparison, if the steering angular velocity information is greater than or equal to the reference angular velocity, absolute steering angle estimation information may be re-determined, and position adjustment control may be performed to move the steering wheel and rack. In addition, if the steering angular velocity information is less than the reference angular velocity, the position adjustment control to move the rack may be performed.

Specifically, if the steering angular velocity information is greater than or equal to the reference angular velocity, the determiner 120 may re-determine the absolute steering angle estimation information within a range not exceeding the steering wheel limit position, and the controller 130 may perform position adjustment control of moving the steering wheel in a direction closer to the steering wheel limit position and moving the rack in a direction closer to the rack limit position.

On the other hand, if the steering angular velocity information is less than the reference angular velocity, the controller 130 may perform position adjustment control to move the rack in a direction closer to the rack limit position. In addition, such position adjustment control may be performed in the case that a preset adjustment condition is satisfied.

As another example, the determiner 120 may determine deviation information about a deviation between positions of the steering wheel and the rack. Here, the deviation between the positions of the steering wheel and the rack may be determined by calculating the degree to which the absolute steering angle of the steering wheel and the absolute position of the rack deviate from the positions corresponding to each other in consideration of the driving ranges of the steering wheel and the rack.

In addition, this deviation information may be determined based on the absolute steering angle information and the rack position information, or may be determined based on the absolute steering angle estimation information and the rack position information, or may be determined based on the actual position of the steering wheel and rack position information.

In this case, in determining the actual position of the steering wheel, if it is determined that the steering wheel has reached the steering wheel limit position based on the steering wheel limit position indication information, the actual position of the steering wheel may be determined to correspond to the steering wheel limit position.

For example, the deviation information may be determined as a deviation between the absolute steering angle information or the position of the rack corresponding to the absolute steering angle information and the rack position information. Alternatively, if it is determined that the steering wheel is located at the steering wheel limit position based on the steering wheel limit position indication information, a deviation between the rack limit position and the rack position information may be determined as deviation information.

For another example, a deviation between a position of a steering wheel corresponding to rack position information and absolute steering angle information or absolute steering angle estimation information may be determined as deviation information. Alternatively, if it is determined that the rack is positioned at the rack limit position based on the rack limit position indication information, the deviation between the steering wheel limit position and absolute steering angle information or the deviation between the steering wheel limit position and absolute steering angle estimation information may be determined as deviation information.

As described above, the contents of the position adjustment control and adjustment conditions described with reference to the determiner 120 will be described in more detail in the section on the controller 130 below.

The controller 130 may perform position adjustment control based on rack position information and absolute steering angle estimation information if an adjustment condition set for at least one of a preset rack limit position and a steering wheel limit position is satisfied.

Here, the adjustment conditions may be set to different conditions according to the steering conditions of the steering device, and if each condition set differently is satisfied, position adjustment control of different contents may be performed.

For example, the adjustment condition may include a condition in which it is determined that the position of the steering wheel corresponds to the steering wheel limit position. Here, the position of the steering wheel may be determined based on one of absolute steering angle information and absolute steering angle estimation information. Alternatively, the position of the steering wheel may be determined based on determining that the steering wheel exists at the steering wheel limit position based on the steering wheel limit position indication information.

As described above, if it is determined that the position of the steering wheel satisfies the adjustment condition corresponding to the steering wheel limit position, thus the adjustment condition is satisfied, position adjustment control for moving the rack in a direction closer to the steering wheel position may be performed.

As another example, the adjustment condition may include a condition in which rack position information is determined to correspond to a rack limit position. Here, the position of the rack may be determined based on rack position information. Alternatively, the position of the rack may be determined based on determining that the rack exists at the rack limit position based on the rack limit position indication information.

As described above, if it is determined that the position of the rack satisfies the adjustment condition corresponding to the rack limit position, position adjustment control may be performed to move the steering wheel in a direction closer to the rack position.

As another example, the adjustment condition may include a condition in which the deviation information regarding the deviation between the positions of the steering wheel and the rack exceeds a predetermined allowable deviation. Here, at least one allowable deviation may be set according to each adjustment condition. For example, a steering wheel allowable deviation and a rack allowable deviation may be separately set, and may be set differently depending on the vehicle and a driving condition of the vehicle.

Specifically, when determining whether the position of the rack corresponds to the position of the steering wheel based on the position of the steering wheel, the deviation information may be determined as a deviation between the position of the rack and the position corresponding to the position of the steering wheel. In addition, if the deviation information exceeds the allowable deviation, there may be determined that the position of the rack does not correspond to the position corresponding to the position of the steering wheel.

Alternatively, when determining whether the position of the steering wheel corresponds to the position of the rack based on the position of the rack, the deviation information may be determined as a deviation between the position of the steering wheel and the position corresponding to the position of the rack. In addition, if this deviation information exceeds the allowable deviation, there may be determined that the position of the steering wheel does not correspond to the position corresponding to the rack position.

For example, if the position of the steering wheel corresponds to the steering wheel limit position, the rack position corresponding to the position of the steering wheel may become the rack limit position. In this case, the deviation between the rack position information and the rack limit position may be determined as the deviation information, and the adjustment condition may be set to a condition in which the deviation information exceeding the allowable deviation.

In addition, if the rack position corresponds to the rack limit position, the position of the steering wheel corresponding to the rack position may be the steering wheel limit position. In this case, the deviation between the absolute steering angle estimation information and the steering wheel limit position may be determined to the deviation information, and the adjustment condition may be set to a condition in which the deviation information exceeding the allowable deviation.

Further, such deviation information and allowable deviation may be defined in an absolute value format for convenience of calculation.

The controller 130 may perform position adjustment control to move the position of at least one of the steering wheel and the rack. The position adjustment control may be set to be performed if it is determined that the steering wheel and the rack are not at positions corresponding to each other. For example, conditions for determining the positions of the steering wheel and the rack may be set as adjustment conditions in advance, and position adjustment control may be performed when the adjustment conditions are satisfied.

Specifically, the controller 130 may perform position adjustment control by moving the position of one of the steering wheel and the rack based on the position of the other one.

In this case, the position of the steering wheel, which is the basis for position adjustment control, may be set to one of absolute steering angle information, absolute steering angle estimation information, and steering wheel limit position indication information. The position of the rack, which is a basis for position adjustment control, may be set to one of rack position information and rack limit position indication information.

For example, based on the steering wheel position determined by the absolute steering angle information, if it is determined that the rack position determined by the rack position information is not at the corresponding position, the controller 130 may perform position adjustment control to move the rack in a direction closer to the position of the steering wheel.

As another example, based on the steering wheel position determined by the absolute steering angle estimation information, if it is determined that the rack position determined by the rack position information is not at the corresponding position, the controller 130 may perform position adjustment control to move the rack in a direction closer to a position corresponding to a steering wheel position.

As another example, if it is determined that the steering wheel exists at the steering wheel limit position based on the steering wheel limit position information, but it is determined that the rack does not exist at the rack limit position based on the rack position information, the controller 130 may perform position adjustment control to move the rack in a direction closer to the rack limit position.

As another example, based on the rack position determined by the rack position information, if it is determined that the absolute steering angle information or the steering wheel position determined by the absolute steering angle information is not at the corresponding position, the controller 130 may perform position adjustment control to move the steering wheel in a direction closer to the rack position.

As another example, if it is determined that the rack exists at the rack limit position based on the rack limit position information, but it is determined that the steering wheel does not exist at the steering wheel limit position based on the absolute steering angle information or the absolute steering angle estimation information, the controller 130 may perform position adjustment control to move the steering wheel in a direction closer to the steering wheel limit position.

In some cases, the controller 130 may perform position adjustment control to move both the steering wheel and the rack. For example, if it is determined that the steering wheel exists at the steering wheel limit position based on the absolute steering angle estimation information, but the steering wheel limit position indication information indicates that the steering wheel does not exist at the steering wheel limit position, the controller 130 may perform position adjustment control to move both the steering wheel and the rack.

Specifically, in the above situation, if steering force or steering torque is applied to the steering wheel in the direction of the steering wheel limit position, the position adjustment control may be performed in such a manner as to perform both control for moving the steering wheel in a direction closer to the steering wheel limit position and control for moving the rack in a direction closer to the rack limit position.

The steering control device of a vehicle 100 according to the present disclosure may be implemented as an electronic control unit (ECU), a microcomputer, or the like.

In an embodiment, a computer system (not shown) such as the vehicle steering control device 100 may be implemented as an electronic control unit (ECU). The electronic control unit may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the steering control device 100 according to the present embodiment and the receiver 110, the determiner 120 and the controller 130 included therein may be implemented as a control device of a steering system of a vehicle or as a module of an ECU.

The control device or ECU of such a steering system may include a processor, a storage device such as a memory, and a computer program capable of performing a specific function. In addition, the above-described receiver 110, the determiner 120 and the controller 130 may be implemented as software modules capable of performing respective corresponding functions.

That is, the receiver 110, the determiner 120 and the controller 130 according to the present embodiment may be implemented as respective software modules and stored in a memory, and each software module may be executed at a specific time point in an arithmetic processing unit such as an ECU included in the steering system.

Figure 2:
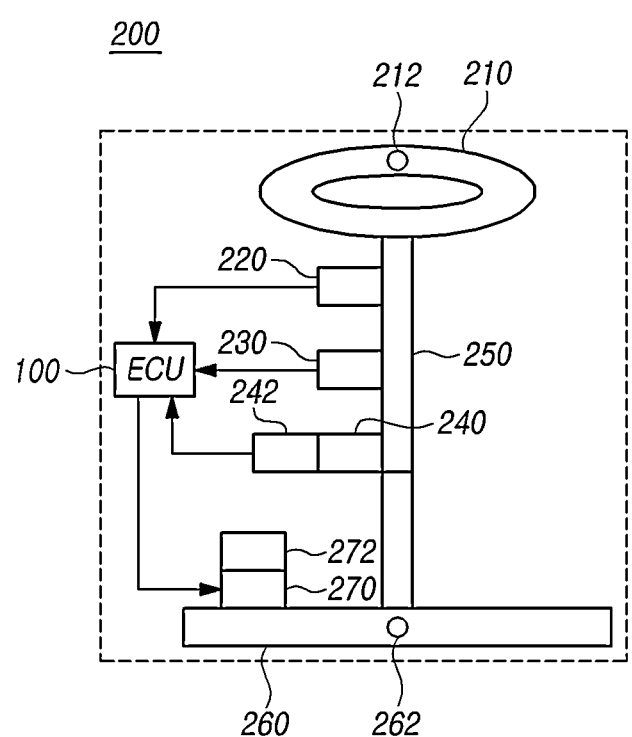
FIG. 2 illustrates an example of a first steering device according to an embodiment.

FIG. 2 illustrates an example of a first steering device according to an embodiment.

Referring to FIG. 2, a first steering device 200 according to an embodiment may include at least one of a vehicle steering control device 100, a steering wheel 210, a steering angle sensor 220, a steering torque sensor 230, a steering motor 240, a torsion bar 250, a rack 260, and a driving motor 270.

In addition, the first steering device 200 may include an electric power steering (EPS) type steering device.

For example, the first steering device 200 may include a configuration for generating steering angle information by sensing the movement of the steering wheel 210 using the steering angle sensor 220, and a configuration of generating steering torque information by sensing the torsional displacement of the torsion bar 250 caused by the movement of the steering wheel 210 using the steering torque sensor 230.

In this case, the steering wheel 210 may include a steering wheel limit position indicator 212.

The steering wheel limit position indicator 212 may generate steering wheel limit position indication information about whether or not the steering wheel is present at the steering wheel limit position. The steering wheel limit position indicator 212 may display the steering wheel limit position indication information in a specific way, or may transmit the steering wheel limit position indication information to other devices.

Here, the determination of whether the steering wheel is present at the steering wheel limit position may be performed by determining that the steering wheel is present at the steering wheel limit position if the steering torque information is greater than or equal to a preset threshold torque. Alternatively, there may be performed by installing a separate switch at the steering wheel limit position so that a constant signal is generated when the steering wheel reaches the steering wheel limit position and the switch operates.

For example, the steering wheel limit position indicator 212 may be visually turned off if the steering wheel position does not correspond to the steering wheel limit position, and turned on if the steering wheel position corresponds to the steering wheel limit position, so that may indicate whether or not the steering wheel limit position has been. In FIG. 2, since the steering wheel position does not correspond to the steering wheel limit position, the light of the steering wheel limit position indicator 212 is turned off.

In addition, the rack limit position indicator 262 may be also turned off if the rack position does not correspond to the rack limit position, and turned on if the rack position corresponds to the rack limit position, thereby indicating whether the rack limit position has been reached. In FIG. 2, since the rack position does not correspond to the rack limit position, the light of the rack limit position indicator 262 is turned off.

Meanwhile, the steering angle sensor 220 may include any configuration capable of measuring the steering angle of the steering wheel, such as a method using two hall sensors, a method using an optical element and a slit plate, or a method using ultrasonic waves.

As another example, the first steering device 200 may include a configuration for generating steering assist torque or reaction force torque using the steering motor 240 based on at least one of steering angle information and steering torque information, and a configuration of generating steering motor position information by sensing the position of the steering motor 240 using the steering motor position sensor 242.

As another example, the first steering device 200 may include a configuration of generating driving force using the driving motor 270 and moving the rack 260 using the generated driving force, and a configuration of generating driving motor position information by sensing the position of the driving motor 270 using the driving motor position sensor 272.

Figure 3:
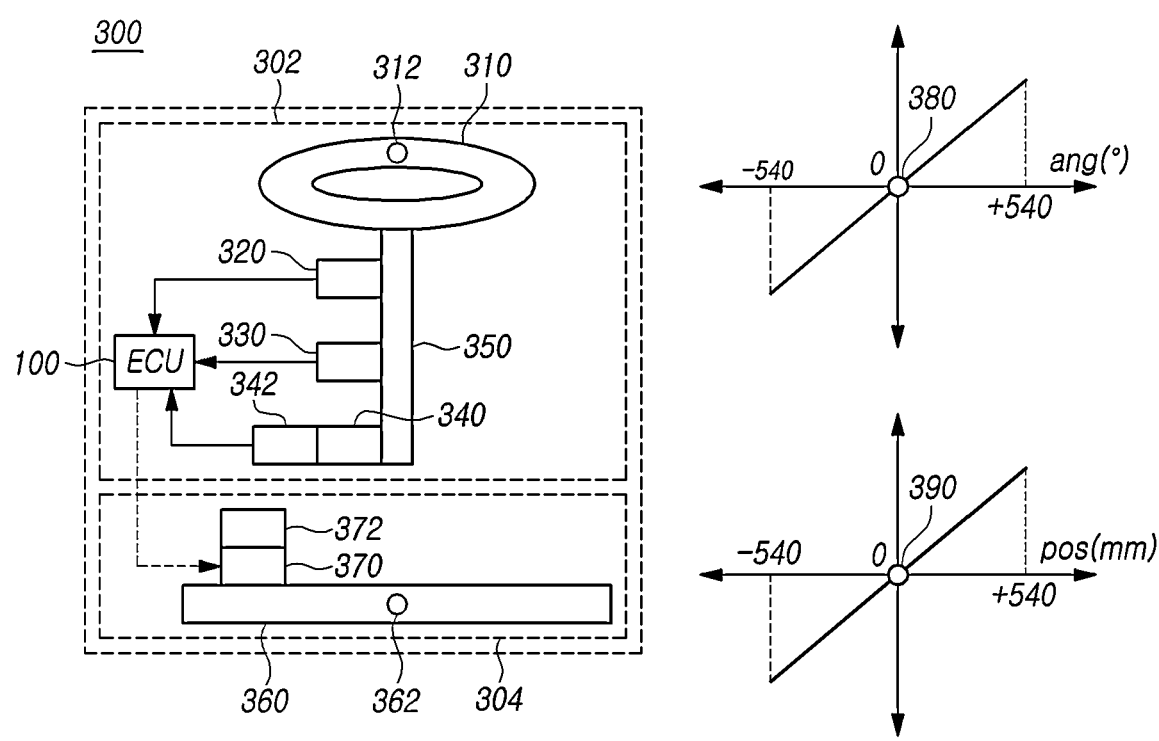
FIG. 3 illustrates an example of a second steering device according to another embodiment.

FIG. 3 illustrates an example of a second steering device 300 according to another embodiment.

Referring to FIG. 3, the second steering device 300 according to an embodiment may include at least one of a vehicle steering control device 100, a steering wheel 310, a steering angle sensor 320, a steering torque sensor 330, a steering motor 340, a torsion bar 350, a rack 360, and a driving motor 370.

In addition, the second steering device 300 may include a steering device of a steer-by-wire (SBW) method. In this case, the first steering device 200 may be divided into a steering reaction force device or a steering feedback actuator (SFA) 302 and a steering driving device or a road wheel actuator (RWA) 304.

The steering feedback actuator 302 may generate a steering reaction force by feedback on the force applied to the steering wheel. In this case, the steering feedback actuator 302 may include at least one of a steering wheel 310, a steering angle sensor 320, a steering torque sensor 330, a steering motor 340, and a torsion bar 350.

The road wheel actuator 304 may generate a steering force to the wheel. In this case, the road wheel actuator 304 may include at least one of a rack 360, a rack limit position indicator 362, a driving motor 370, and a driving motor position sensor 372.

Since the second steering device 300 is different from the first steering device 200 in that the steering feedback actuator 302 and the road wheel actuator 304 are not physically connected, the function and effect thereof may be different according to this difference.

For example, the steering motor 240 of the first steering device 200 is configured to generate steering assist torque, but the steering motor 340 of the second steering device 300 generates reaction force torque.

For another example, the rack 260 of the first steering device 200 may be used to steer using both the steering force transmitted from the steering wheel and the driving force generated from the driving motor 240. However, the rack 360 of the second steering device 300 is different in that the rack cannot receive steering force from the steering wheel and is capable of steering the wheel using the driving force generated by the driving motor 340.

However, the first steering device 200 and the second steering device 300 correspond to each other in the steering of the vehicle, except for the part where the structural difference occurs as described above. The corresponding component thereof may provide the same functions and operational effects.

In addition, in the second steering device 300 described in FIGS. 3 to 7, it is assumed that a neutral position of the steering wheel is a position where the absolute steering angle and the relative steering angle are 0 degrees, that is, a position where the steering wheel limit position indicator 312 is shown in FIG. 3. In addition, it is assumed that the absolute steering angle is in a range of −540 degrees (1.5 turns counterclockwise) to +540 degrees (1.5 turns clockwise) from the neutral position, and the relative steering angle is in a range of −180 degrees (0.5 turns counterclockwise) to +180 degrees (0.5 rotation clockwise) from the neutral position.

In addition, it will be described an embodiment in which the steering wheel limit positions are set to −540 degrees and +540 degrees, the rack limit positions are set to −540 mm on the left and +540 mm on the right, and the allowable deviation is set to 30, respectively.

That is, it is assumed that the steering wheel is set to be able to rotate up to 1.5 turns to the left and right respectively. For example, if the position of the steering wheel 310 is +X degrees, it is assumed that the position of the rack 360 corresponding to this position of the steering wheel is +X mm. Of course, these settings are only examples for explaining the present disclosure, and are not limited thereto.

Meanwhile, referring to the graph shown in FIG. 3, the upper graph illustrates the position and movable range of the steering wheel 310 in an angular format, and the lower graph illustrates the position and movable range of the rack 260 in a distance (mm) format.

In this case, the movable range of the steering wheel corresponds to −540 to +540 degrees, an actual position 380 of the steering wheel corresponds to 0 degree. In addition, the movable range of the rack is −540 mm to +540 mm, and an actual position 390 of the rack corresponds to 0 mm.

In addition, it is assumed a configuration in which the steering wheel limit position indicator 312 and the rack limit position indicator 362 are turned off when the steering wheel and the rack do not correspond to each limit position, and the steering wheel limit position indicator 312 and the rack limit position indicator 362 are turned on when the steering wheel and the rack correspond to each limit position, respectively.

Accordingly, it is possible to identify the relative steering angle of the steering wheel 310 and whether of corresponding to the steering wheel limit position through the steering wheel limit position indicator 312, and identify the position of the rack 360 and whether of corresponding to the rack limit position through the rack limit position indicator 362.

For example, referring to FIG. 3, there may be identified that the steering wheel is in a neutral state and the relative steering angle is 0 degrees and does not correspond to the steering wheel limit position by using the steering wheel limit position indicator 312. In addition, there may be identified that the position of the rack 360 is in a neutral state, and the rack position is 0 mm and does not correspond to the rack limit position through the rack limit position indicator 362.

This configuration may be similarly applied to FIGS. 4 to 7 below.

Meanwhile, the steering device according to the present disclosure may include not only the first steering device 200 and the second steering device 300 shown in FIGS. 2 and 3, but also any device having a configuration common thereto. The absolute steering angle estimation and position adjustment control may be performed based on these steering devices. However, in FIGS. 4 to 7, it will be described based on the second steering device 300 for more concise description.

Figure 4:
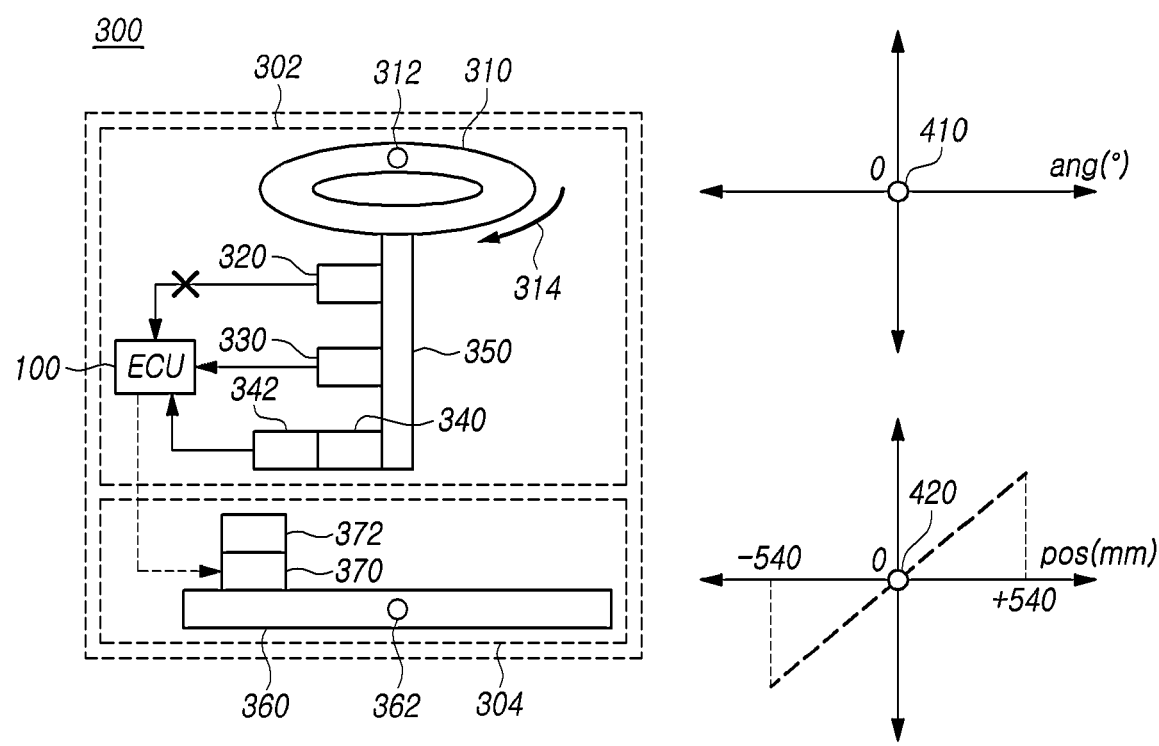
FIG. 4 is a diagram for illustratively explaining a case in which there is an abnormality in absolute steering angle information according to an embodiment.

FIG. 4 is a diagram for illustratively explaining a case in which there is an abnormality in absolute steering angle information according to an embodiment.

For example, the second steering device 300 in FIG. 4 illustrates a case in which an error occurs in the steering angle sensor 320 or the sensing signal thereof, that is, a case that the absolute steering angle information cannot be properly transmitted to the vehicle steering control device 100.

Accordingly, even if a steering force is applied to the steering wheel 310, absolute steering angle information may not be properly generated. In addition, since absolute steering angle information may not be properly transmitted to the vehicle steering control device 100, there may be difficult for the drive motor 370 to change the rack position.

The graph shown in FIG. 4 represents the movable range and position of the steering wheel 310 and the rack 360 in the case that there is an abnormality in the absolute steering angle information.

In the case that an error occurs in the absolute steering angle information and the absolute steering angle cannot be identified, since the absolute steering angle information is not transmitted even if the steering wheel is physically manipulated, the vehicle steering control device 100 may recognize that the steering wheel has a movable range of 0 degrees to 0 degrees.

As a result, even if a steering force is applied to the steering wheel 310 in a state in which an actual position 410 of the steering wheel is neutral, the absolute steering angle information determined to the neutral position of 0 degrees may not be updated.

In addition, even if the physical movable range of the rack corresponds to −540 mm to +540 mm, since it is difficult to update the actual position 420 of the rack due to an abnormality in the absolute steering angle information, it is also difficult to control the movement of the rack 360. That is, the rack position information and the rack actual position 420 may not be updated any more from the initial neutral position of 0 mm.

Accordingly, if an abnormality occurs in the absolute steering angle information in the second steering device 300, it may be difficult to control the movement of the rack 360 by applying a driving force from the driving motor 370 using an electronic signal created based on absolute steering angle information.

In addition, since the second steering device 300 does not have a mechanical connection between the steering feedback actuator 302 and the road wheel actuator 304, the movement control of the rack 360 cannot be performed by physically transmitting the steering force from the steering wheel 310.

Accordingly, in the situation shown in FIG. 4, there may be difficult to control the movement of the rack position in the second steering device 300, and accordingly, there may be occurred a situation in which steering of the vehicle itself becomes impossible.

However, the vehicle steering control device 100 according to the present disclosure may include, in order to solve the above steering disabled state, a configuration in which the absolute steering angle estimation information is determined using the steering motor position information, steering torque information, relative steering angle information, and rack position information, even if there is an abnormality in the absolute steering angle information, so that steering control may be continuously performed based on the absolute steering angle estimation information.

However, in the case that the steering control is performed based on the absolute steering angle estimation information, there may be generated an error between the absolute steering angle estimation information and the rack position information in the steering process. In this case, it is possible to reduce or eliminate the error by performing position adjustment control according to each situation.

Figure 5:
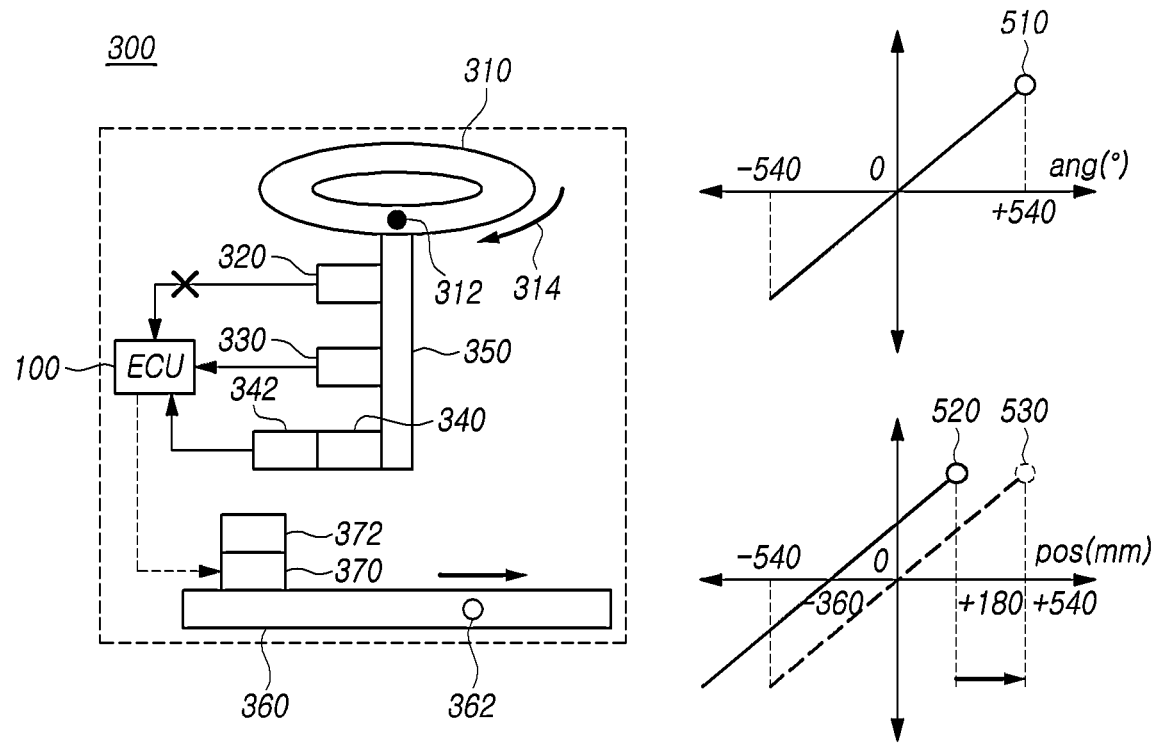
FIG. 5 is a diagram for explaining a case where the position of the steering wheel corresponds to a steering wheel limit position of the according to an embodiment.
Figure 6:
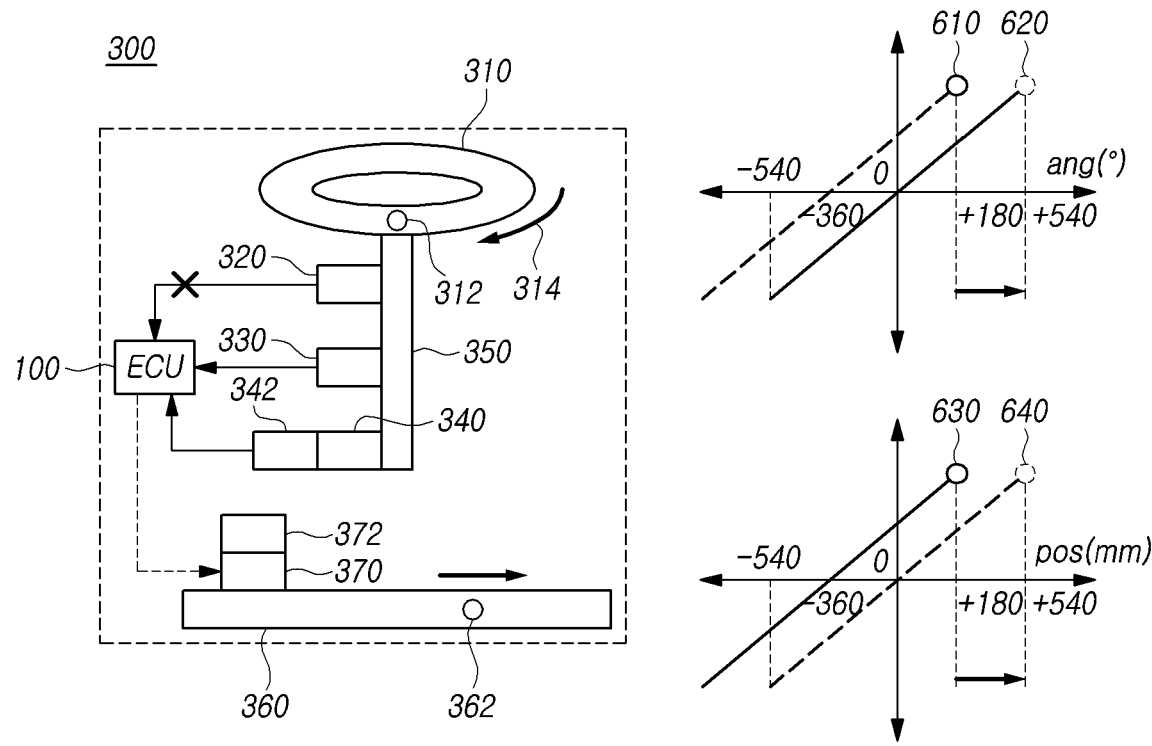
FIG. 6 is a diagram for explaining a case in which absolute steering angle estimation information corresponds to a steering wheel limit position, but the actual position of the steering wheel does not correspond to a steering wheel limit position according to an embodiment.
Figure 7:
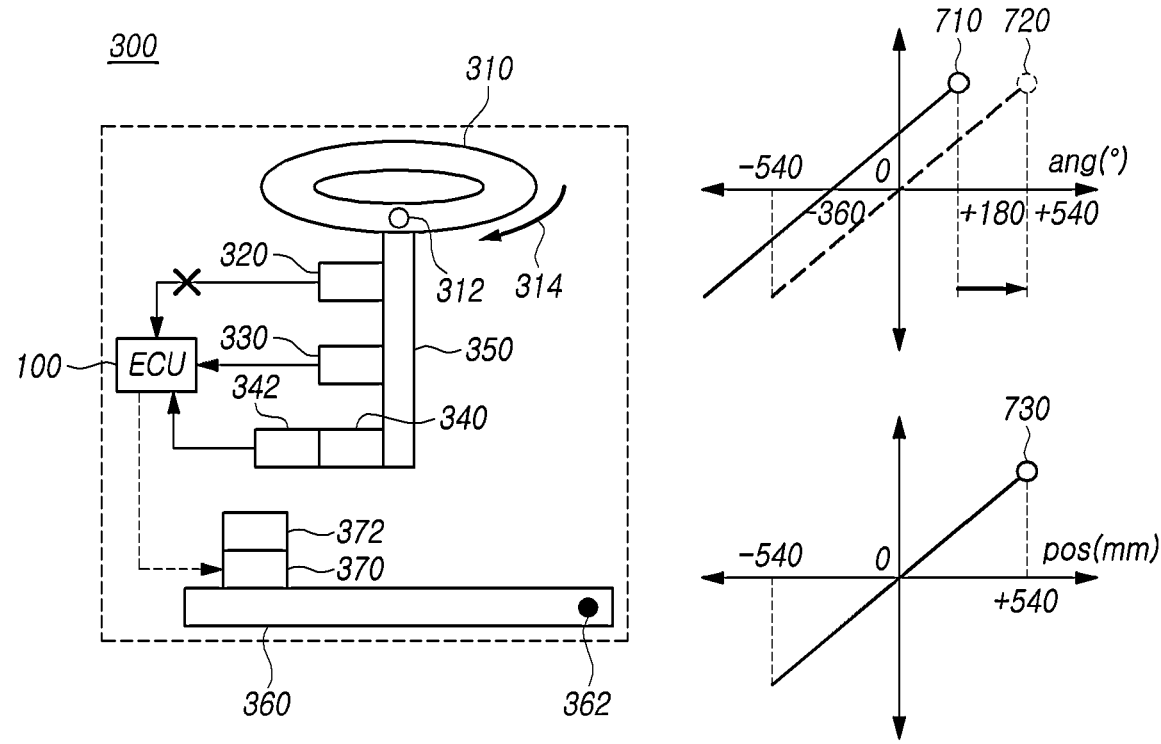
FIG. 7 is a diagram for explaining a case where a rack position corresponds to a rack limit position according to an embodiment.

Hereinafter, FIGS. 5 to 7 illustrate an embodiment in which position adjustment control is performed for each situation that may occur when steering control is performed based on absolute steering angle estimation information as described above.

FIG. 5 is a diagram for explaining a case where the position of the steering wheel corresponds to a steering wheel limit position of the according to an embodiment.

For example, the second steering device 300 in FIG. 5 illustrates a case in which the position of the steering wheel 310 corresponds to the steering wheel limit position, and the position of the rack 360 does not correspond to the rack limit position.

When determined through the steering wheel limit position indicator 312 in FIG. 5, the position of the steering wheel 310 is at a position rotated by 180 degrees clockwise from the neutral position of 0 degree, so the relative steering angle may be determined as 180 degrees. In addition, since the light of the steering wheel limit position indicator 312 is turned on, there may be determined that the steering wheel limit position, that is, the absolute steering angle corresponds to +540 degrees, and the steering force 314 continues to be applied clockwise in this situation.

Meanwhile, when determined through the rack limit position indicator 362 in FIG. 5, the position of the rack 360 is in a state of being moved to the right from the neutral position of 0 mm. However, since the light of the rack limit position indicator 362 is turned off, there may be determined that the rack is in a state not corresponding to the rack limit position.

In addition, the graphs in FIG. 5 represent the movable range and position the steering wheel 310 and the rack 360, respectively in the case that the position of the steering wheel 310 corresponds to the steering wheel limit position and the position of the rack 360 does not correspond to the rack limit position.

According to the graph shown in FIG. 5, an actual position 510 of the steering wheel is at +540 degrees, that is, the steering wheel limit position, and if it is normally steered, the position of the rack 360 corresponding to the position of the steering wheel should be +540 mm.

However, as shown in the graph, an actual position 520 of the rack corresponds to +180 mm, which indicates a case where the steering wheel 310 and the rack 360 do not exist at positions corresponding to each other.

In this case, the determiner 120 may determine the deviation information as 540−180=360, which exceeds the allowable deviation of 30, so the controller 130 may determine that position adjustment control is required.

Accordingly, in a situation where the actual position 510 of the steering wheel reaches the clockwise limit position of +540 degrees, the controller 130 may perform position adjustment control to move the position of the rack 360 from the current rack actual position 520 of 180 mm to the rack corresponding position 530 of +540 mm.

As described above, in the case of moving the position of the rack 360 to the right through the position adjustment control, the position adjustment control may be performed until the position of the rack 360 reaches +540 mm, which is the rack limit position. In this case, whether or not the rack limit position has been reached may be determined using at least one of rack position information and rack limit position indication information.

FIG. 6 is a diagram for explaining a case in which absolute steering angle estimation information corresponds to a steering wheel limit position, but the actual position of the steering wheel does not correspond to a steering wheel limit position according to an embodiment.

For example, FIG. 6 represents, during the second steering device 300 performs steering control based on the absolute steering angle estimation information, a case in which the position of the steering wheel 310 determined based on the absolute steering angle estimation information corresponds to a steering wheel limit position, but the actual position of the steering wheel 310 does not correspond to a steering wheel limit position.

In addition, FIG. 6 represents a case in which, if the position of the rack 360 is determined to correspond to the position corresponding to the estimated position of the steering wheel 310, the position of the rack 360 should correspond to the rack limit position, but the actual position of the rack 360 does not correspond to the rack limit position.

The actual position of the steering wheel 310, when determined through the steering wheel limit position indicator 312 shown in FIG. 6, is at a position rotated by 180 degrees clockwise from the neutral position of 0 degrees, so that the relative steering angle may be determined as 180 degrees. In addition, since the light of the steering wheel limit position indicator 312 is turned off, there may be determined that the steering wheel 310 is not in a state corresponding to the absolute steering angle +540 degrees, which is the steering wheel limit position. In addition, in this situation, there may be determined that the steering force 314 continues to be applied in a clockwise direction.

However, referring to the graph shown in FIG. 6, the steering wheel estimated position 620 is determined as +540 degrees. That is, this case indicates that an error has occurred between the steering wheel estimated position 620 determined based on the absolute steering angle estimation information and the actual position 610 of the steering wheel.

Meanwhile, since the light of the rack limit position indicator 362 is turned off as shown in the rack limit position indicator 362 of FIG. 6, there may be determined that the actual position of the rack 360 does not correspond to the rack limit position.

However, referring to the graph shown in FIG. 6, even though the rack actual position 630 is +180 mm, the corresponding rack position 640 indicates that it is determined as +540 mm. That is, this indicates, when the steering wheel estimated position 620 and the rack corresponding position 640 are determined based on the absolute steering angle estimation information, that an error has occurred between the rack corresponding position 640 and the rack actual position 630.

As a result, both the steering wheel 310 and the rack 360 do not correspond to the limit position based on the actual position, but it is erroneously determined that each estimated position determined based on the absolute steering angle estimation information corresponds to the limit position. Therefore, position adjustment control for both the steering wheel 310 and the rack 360 is required.

In this case, the controller 130 may determine that, even though the steering wheel estimated position 620 corresponds to the steering wheel limit position of +540 mm, the steering wheel limit position indicator 312 indicates that the steering wheel actual position 610 does not correspond to the steering wheel limit position. Accordingly, the controller 130 may perform position adjustment control to move the steering wheel 310 in a direction closer to or approaching the steering wheel limit position.

In addition, the controller 130 may determine that, even though that the rack corresponding position 640 corresponds to the rack limit position +540 mm, but the rack limit position indicator 362 indicates that the actual rack position 610 does not correspond to the rack limit position. Accordingly, the controller 130 may perform position adjustment control to move the rack 360 in a direction closer to or approaching the rack limit position.

In addition, when the position of the steering wheel 310 is moved clockwise through the position adjustment control, the position adjustment control may be performed until the position of the steering wheel 310 reaches +540 degrees, which is the steering wheel limit position. In this case, the controller 130 may determine whether or not the steering wheel limit position is reached by using at least one of absolute steering angle information, absolute steering angle estimation information, steering wheel limit position indication information, and rack position information.

Similarly, when moving the position of the rack 360 to the right through position adjustment control, position adjustment control may be performed until the position of the rack 360 reaches +540 mm, which is the rack limit position. In this case, the controller 130 may determine whether the rack limit position has been reached by using at least one of rack position information and rack limit position indication information.

Meanwhile, as in the embodiment of FIG. 6, in the case of performing the position adjustment control of the steering wheel 310 since it is determined that the steering wheel estimated position 620 corresponds to the steering wheel limit position, but the steering wheel actual position 610 does not correspond to the steering wheel limit position, the determiner 120 may re-determine the absolute steering angle estimation information within a range that does not exceed the steering wheel limit position.

In the embodiment of FIG. 6 as an example, when the absolute steering angle estimation information is determined at +540 degrees and the steering force 314 is applied clockwise, in order for the absolute steering angle estimation information not to exceed the steering wheel limit position +540 degrees, the determiner 120 may re-determine the absolute steering angle estimation information to be maintained at +540 degrees while performing the position adjustment control for the steering wheel 310.

FIG. 7 is a diagram for explaining a case where a rack position corresponds to a rack limit position according to an embodiment.

For example, in the second steering device 300 of FIG. 7, there is exemplified a case in which the position of the steering wheel 310 does not correspond to the steering wheel limit position and the position of the rack 360 corresponds to the rack limit position.

When determined through the steering wheel limit position indicator 312 in FIG. 7, the actual position of the steering wheel 310 is at a position rotated by 180 degrees clockwise from the neutral position of 0 degree, so the relative steering angle may be determined as 180 degrees. In addition, since the light of the steering wheel limit position indicator 312 is turned off, there may be determined that the steering wheel 310 is not in a state corresponding to the absolute steering angle +540 degrees, which is the steering wheel limit position, and in this situation, the steering force 314 continues to be applied clockwise.

Meanwhile, since the light of the rack limit position indicator 362 in FIG. 7 is turned on, there may be determined that the actual position of the rack 360 corresponds to the rack limit position.

In addition, the graphs in FIG. 7 represent the movable range and position of the steering wheel 310 and the rack 360, respectively, in the case that the position of the steering wheel 310 does not correspond to the steering wheel limit position, and the position of the rack 360 corresponds to the rack limit position.

According to the graph shown in FIG. 7, the steering wheel actual position 710 is +180 degrees, and if it is normally steered, the corresponding position of the rack 360 should be +180 mm.

However, as shown in the graph, since the rack actual position 720 corresponds to +540 mm, this is a case in which the steering wheel 310 and the rack 360 do not exist at positions corresponding to each other.

In this case, the determiner 120 may determine the deviation information as 540−180=360, and since this exceeds the allowable deviation of 30, the controller 130 may determine that the position adjustment control is required.

Accordingly, in a situation where the actual rack position 730 reaches the limit position in the right direction of +540 mm, the controller 130 may perform position adjustment control to move the position of the steering wheel 310 from the current steering wheel actual position 710 of +180 degrees to the steering wheel corresponding position 720 of +540 degrees.

As described above, when moving the position of the steering wheel 310 clockwise through the position adjustment control, the position adjustment control may be performed until the position of the steering wheel 310 reaches +540 mm, which is the steering wheel limit position. In this case, the controller 130 may determine whether the rack limit position has been reached using at least one of rack position information and rack limit position indication information.

As described above, if an error or deviation occurs since the actual or estimated positions of the steering wheel and the rack do not correspond to positions corresponding to each other, the vehicle steering control apparatus 100 according to the present disclosure may perform position adjustment control capable of removing or reducing such an error or deviation.

In the above, there has been described the case where it is determined that the steering angle sensor or the sensing signal thereof has an abnormality and absolute steering angle estimation information is used for position adjustment control. However, the position adjustment control according to the present disclosure may be applied to all cases where, even if an abnormality does not necessarily occur, an error or deviation occurs since the steering wheel and the rack do not correspond to each other in the steering process.

Hereinafter, the steering control device of a vehicle 100 will be described again from the viewpoint of the control method, and overlapping contents of the above description will be omitted if necessary, but may be applied to the method below.

Figure 8:
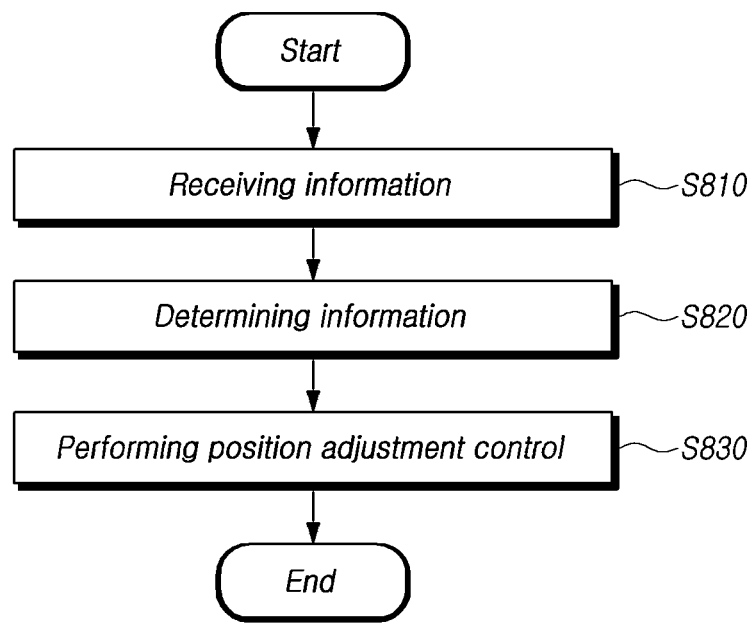
FIG. 8 is a flowchart of a vehicle steering control method according to an embodiment.

FIG. 8 is a flowchart of a vehicle steering control method according to an embodiment.

Referring to FIG. 8, a steering control method for a vehicle according to the present disclosure may include an information receiving step (S810) for receiving absolute steering angle information, relative steering angle information, and rack position information of a vehicle, an information determination step (S820) of determining absolute steering angle estimation information based on the rack position information and the relative steering angle information if there is an abnormality in the absolute steering angle information, and a position adjustment control step (S830) of performing, if an adjustment condition is satisfied for at least one of a rack limit position and a steering wheel limit position, a position adjustment control based on the rack position information and the absolute steering angle estimation information.

In the information receiving step (S810), absolute steering angle information, relative steering angle information, rack position information, and limit position indication information may be received from a sensor device or another device in the vehicle.

In the information receiving step (S810), other sensor information necessary for determining absolute steering angle estimation information may be received. In this case, the other sensor information may include at least one of steering motor position information, steering torque information, driving motor position information, and rack position information, but is not limited thereto, and may include all information used for absolute steering angle information estimation.

In addition, in the information receiving step (S810), the limit position indication information may be received from the limit position indicator. Specifically, at least one of the steering wheel limit position indication information and the rack limit position indication information may be received from the steering wheel limit position indicator and the rack limit position indicator, respectively.

In the information determination step (S820), new information may be determined based on the information received from the receiver, or the determined information may re-determined using other information or a preset value.

For example, in the information determination step (S820), the absolute steering angle estimation information may be determined based on the rack position information and the relative steering angle information. In this case, the absolute steering angle estimation information may be determined if it is determined that there is an abnormality in the absolute steering angle information.

Then, in the information determination step (S820), section estimation information and relative steering angle estimation information corresponding to the steering wheel position corresponding to the rack position may be determined by using the steering wheel position determination result.

Further, the relative steering angle estimation information may be compared with the relative steering angle information. If the difference between the relative steering angle information and the relative steering angle estimation information is greater than a preset tolerance, absolute steering angle information may be determined using the section estimation information and the relative steering angle information.

That is, in the information determination step (S820), the absolute steering angle estimation information may be determined by using only the rack position information, or the absolute steering angle estimation information may be determined using the rack position information and the relative steering angle information.

As another example, in the information determination step (S820), the absolute steering angle estimation information may re-determined. In addition, in some cases, the absolute steering angle estimation information may be re-determined if a preset re-determination condition is satisfied.

For example, a condition indicating that the absolute steering angle estimation information corresponds to the steering wheel limit position, but the steering wheel limit position indication information does not correspond to the steering wheel limit position may be set as the re-determination condition. In this case, re-determination of the absolute steering angle estimation information may be performed within a range not exceeding the steering wheel limit position.

As another example, in the information determination step (S820), relative steering angle information may be determined. In this case, the relative steering angle information may be determined based on information received from a steering angle sensor, or may be determined based on at least one of steering motor position information received from a steering motor position sensor and steering torque information received from a steering torque sensor.

As another example, in the information determination step (S820), steering angular velocity information may determined. In this case, the steering angle velocity information may be determined by calculating a steering angle change rate based on the steering angle information. Here, the steering angle information used to calculate the steering angle velocity information may include one or more of absolute steering angle information and relative steering angle information.

As a more specific example, if it is determined that there is no abnormality in the steering angle sensor or the sensing signal thereof, steering angle velocity information may be determined based on absolute steering angle information.

On the other hand, if it is determined that there is an abnormality in the steering angle sensor or the sensing signal thereof, steering angular velocity information may be determined based on relative steering angle information. In this case, the relative steering angle information may be information determined based on steering motor position information or steering torque information.

As another example, in the information determination step (S820), a magnitude comparison result between steering angular velocity information and a preset reference angular velocity may be determined. As a result of the magnitude comparison, if the steering angular velocity information is greater than or equal to the reference angular velocity, absolute steering angle estimation information may be re-determined, and position adjustment control may be performed to move the steering wheel and rack. In addition, if the steering angular velocity information is less than the reference angular velocity, the position adjustment control to move the rack may be performed.

As another example, in the information determination step (S820), deviation information about a deviation between positions of the steering wheel and the rack may be determined. Here, the deviation between the positions of the steering wheel and the rack may be determined by calculating the degree to which the absolute steering angle of the steering wheel and the absolute position of the rack deviate from the positions corresponding to each other in consideration of the driving ranges of the steering wheel and the rack.

In the position adjustment control step (S830), a position adjustment control may be performed based on rack position information and absolute steering angle estimation information if an adjustment condition set for at least one of a preset rack limit position and a steering wheel limit position is satisfied.

Here, the adjustment conditions may be set to different conditions according to the steering conditions of the steering device, and if each condition set differently is satisfied, position adjustment control of different contents may be performed.

For example, the adjustment condition may include a condition in which it is determined that the position of the steering wheel corresponds to the steering wheel limit position, a condition in which the rack position information is determined to correspond to the rack limit position, and a condition in which the deviation information regarding the deviation between the positions of the steering wheel and the rack exceeds the preset allowable deviation.

Specifically, in the position adjustment control step (S830), the position adjustment control may be performed by moving the position of one of the steering wheel and the rack based on the position of the other one. In this case, the position of the steering wheel, which is the basis for position adjustment control, may be set to one of absolute steering angle information, absolute steering angle estimation information, and steering wheel limit position indication information. The position of the rack, which is a basis for position adjustment control, may be set to one of rack position information and rack limit position indication information.

For example, in the position adjustment control step (S830), based on the steering wheel position determined by the absolute steering angle information, if it is determined that the rack position determined by the rack position information is not at the corresponding position, the position adjustment control may be performed to move the rack in a direction closer to the position of the steering wheel.

As another example, in the position adjustment control step (S830), based on the steering wheel position determined by the absolute steering angle estimation information, if it is determined that the rack position determined by the rack position information is not at the corresponding position, the position adjustment control may be performed to move the rack in a direction closer to a position corresponding to a steering wheel position.

As another example, in the position adjustment control step (S830), if it is determined that the steering wheel exists at the steering wheel limit position based on the steering wheel limit position information, but it is determined that the rack does not exist at the rack limit position based on the rack position information, the position adjustment control may be performed to move the rack in a direction closer to the rack limit position.

As another example, in the position adjustment control step (S830), based on the rack position determined by the rack position information, if it is determined that the absolute steering angle information or the steering wheel position determined by the absolute steering angle information is not at the corresponding position, the position adjustment control may be performed to move the steering wheel in a direction closer to the rack position.

As another example, in the position adjustment control step (S830), if it is determined that the rack exists at the rack limit position based on the rack limit position information, but it is determined that the steering wheel does not exist at the steering wheel limit position based on the absolute steering angle information or the absolute steering angle estimation information, the position adjustment control may be performed to move the steering wheel in a direction closer to the steering wheel limit position.

In some cases, in the position adjustment control step (S830), the position adjustment control may be performed to move both the steering wheel and the rack. For example, if it is determined that the steering wheel exists at the steering wheel limit position based on the absolute steering angle estimation information, but the steering wheel limit position indication information indicates that the steering wheel does not exist at the steering wheel limit position, the position adjustment control may be performed to move both the steering wheel and the rack.

Figure 9:
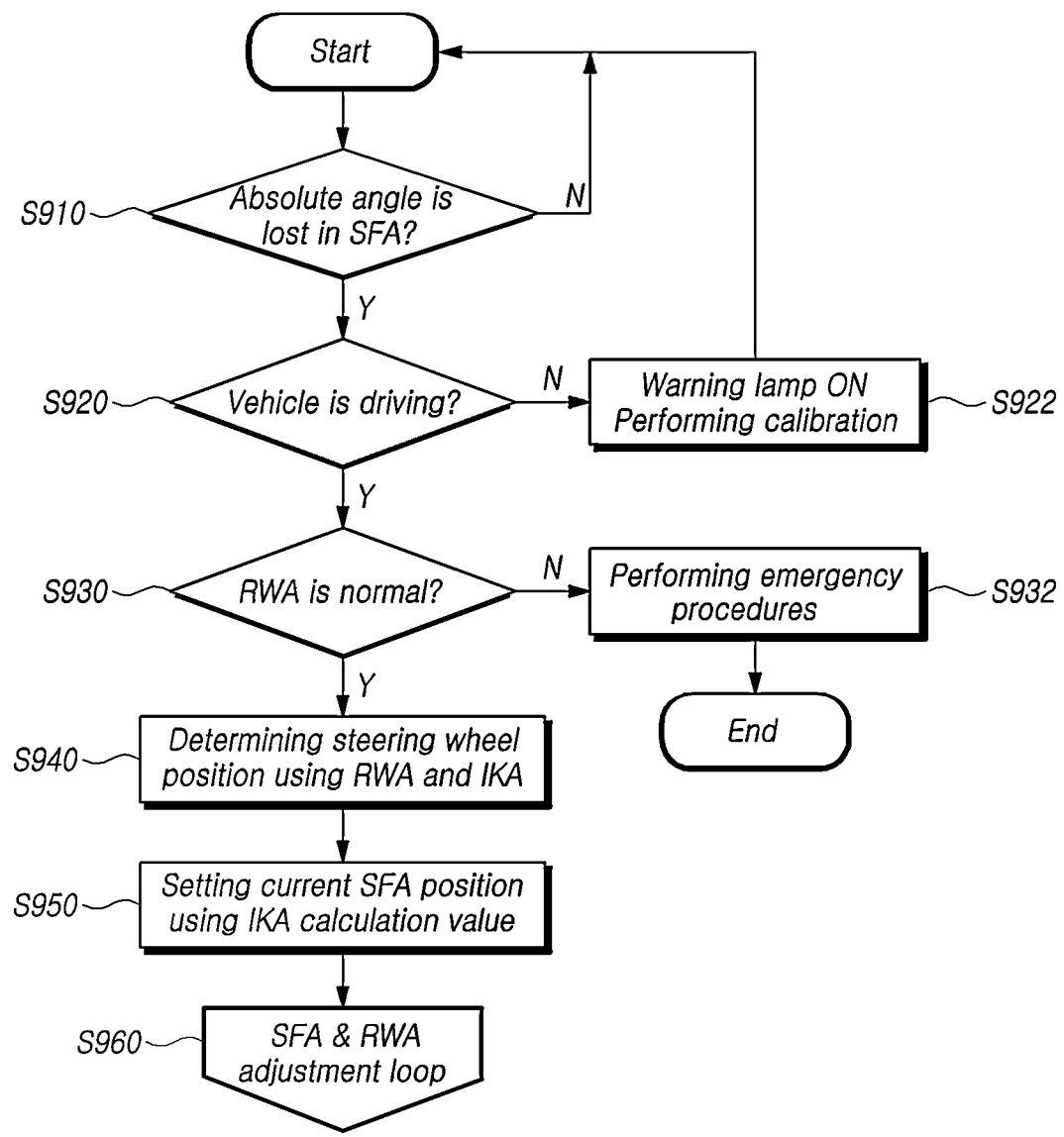
FIGS. 9 and 10 are flowcharts illustrating a process of performing a vehicle steering control method according to another embodiment.
Figure 10:
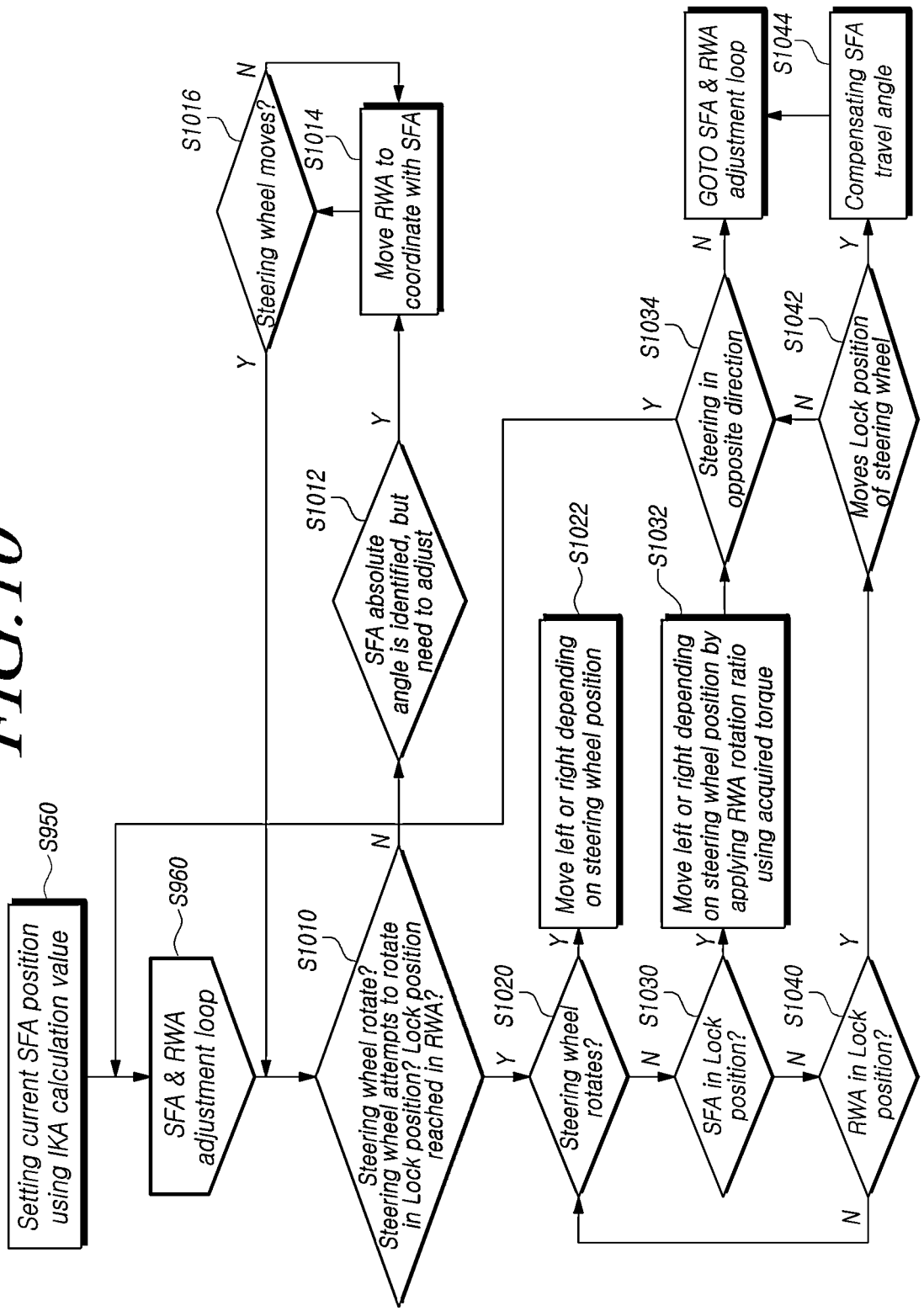

FIGS. 9 and 10 are flowcharts illustrating a process of performing a vehicle steering control method according to another embodiment.

In FIGS. 9 and 10, SFA may mean a steering feedback actuator including a steering wheel, and RWA may mean a road wheel actuator including a rack. In addition, the position of the SFA may mean a position of the steering wheel or steering angle, the RWA position may mean the rack position, the SFA lock position may mean the steering wheel limit position, and the RWA lock position may mean the rack limit position.

Referring to FIG. 9, the vehicle steering control method according to an embodiment may include a step of determining whether an SFA absolute angle is lost (S910). Loss of the absolute angle may mean a case where an abnormality occurs in the absolute steering angle. If the absolute angle is not lost, the vehicle steering control method according to the present embodiment may be terminated. In contrast, in the case that the absolute angle is lost, a step of determining whether the vehicle is driving (S920) may be performed.

In the step of determining whether the vehicle is driving (S920), if the vehicle is not driving in a situation where the SFA absolute angle is lost, a warning lamp may be turned on, and calibration may be performed to adjust the non-synchronization due to loss of the absolute angle. In contrast, if the vehicle is driving, an RWA normality determination step (S930) may be performed.

If the RWA is not normal in a situation in which the absolute angle of the SFA is lost and the vehicle is driving, it may be impossible to perform the normal steering, thereby increasing the risk. Therefore, in the RWA normality determination step (S930), the safety of the vehicle may be ensured by allowing the vehicle to drive a preset low speed and to proceed with an emergency procedure such as stopping the vehicle on the shoulder.

In contrast, if the RWA is normal, the steering wheel position of the SFA may be determined using the position of the RWA to maintain the steering of the vehicle, so the next step is performed.

In a step of determining the steering wheel position using RWA and IKA (S940), the position of the steering wheel may be determined by using an inverse kinematics algorithm (IKA) based on the position of the RWA determined to be normal.

In the step of setting the current SFA position using the IKA calculation value (S950), the position of the current SFA may be set using the steering wheel position calculated in the step S940. That is, absolute steering angle estimation information in SFA may be determined using rack position information in RWA and IKA operation.

Then, position adjustment control may be performed by performing an SFA & RWA adjustment loop (S960). This SFA & RWA adjustment loop (S960) will be described in detail with reference to FIG. 10 below.

Referring to FIG. 10, the SFA & RWA adjustment loop (S960) may include determining whether or not the steering wheel rotates, whether or not the steering wheel attempts to rotate in the locked position, and whether or not the lock position has been reached in the RWA (S1010).

In this case, if at least one condition of the steering wheel rotation, the steering wheel rotation attempt at the locked position, and the RWA reaching the lock position is satisfied, it is determined to be Yes, and if neither is satisfied, it is determined to be No. If it is determined to be No in the step S1010, there may proceed to a step of determining whether to need to adjust even though SFA absolute angle is identified (S1012).

Even in a situation where the absolute angle is lost due to a failure of the steering angle sensor, normal steering control can be possible if the SFA recognizes the absolute angle using another path. However, even in such a situation, if SFA and RWA are out of sync, it is required to adjust to match SFA and RWA. Therefore, the step of determining whether to need to adjust even though SFA absolute angle is identified (S1012) may be performed to identify this situation.

As a result of this determination, if it is determined that adjustment is required, a step of adjusting the SFA by moving the RWA (S1014) may be performed. Then, after the adjustment according to S1014, a step of determining whether the steering wheel is moved (S1016) may be performed.

If it is determined that the steering wheel is not moving in the step of determining whether the steering wheel is moving (S1016), the step of moving the RWA and adjusting the SFA (S1014) based on the non-moving steering wheel is further performed. In the case that the steering wheel is moved in the step of determining whether the steering wheel is moving (S1016), it returns to the starting point of the SFA & RWA adjustment loop 960 without further adjustment.

If at least one condition of the steering wheel rotation, the steering wheel rotation attempt at the locked position, and the RWA reaching the lock position is satisfied (i.e., YES) in the step S1010, a step of determining whether the steering wheel rotates (S1020) may be performed.

If it is determined that the steering wheel rotates in the steering wheel rotation determination step (S1020), the step of moving left or right according to the steering wheel position (S1022) may be performed. Accordingly, the RWA may be controlled to move to a position corresponding to the movement of the steering wheel. In addition, if it is determined that the steering wheel does not rotate in step S1020 of determining whether the steering wheel rotates, there may be performed a step of determining whether the SFA is in a locked position (S1030).

If it is determined that the SFA is in a locked position n the step of determining whether the SFA is in a locked position (S1030), there may be performed a step of moving to the left or right according to the steering wheel position by applying the RWA rotation ratio using the torque (S1032). Therefore, there may be performed the position adjustment control that causes the RWA to move at the speed calculated by applying the amount of torque obtained from the RWA and the rotation ratio of the RWA before the steering wheel reaches the locked position. Thereafter, a step of determining whether to steer in the opposite direction (S1034) may be performed.

In the step of determining whether to steer in the opposite direction (S1034), if the direction of movement of the RWA or the direction of the lock position when the RWA reaches the lock position and the steering direction are in the opposite direction, it may be difficult to adjust the RWA and SFA. In this case, it is possible to return to the step of setting the current SFA position using the IKA calculation value (S950). However, if the steering direction is not in the opposite direction, it may return to the start of the SFA & RWA adjustment loop (S960).

On the other hand, if it is not determined that the SFA is in a locked position, a step of determining whether the RWA is in a locked position (S1040) may be performed.

If it is determined that the RWA is the locked position in the step of determining whether the RWA is in the locked position (S1040), there may be performed a step of determining whether the steering wheel is moved to the lock position (S1042).

If it is determined that the steering wheel moves toward the lock position in the step S1042, there may be performed an SFA travel angle compensation step (S1044). In addition, if it is determined that the steering wheel does not move toward the lock position, there may be performed a step for determining whether to steer in the opposite direction (S1034).

As described above, the present disclosure may provide a vehicle steering control device and control method capable of performing steering control by estimating a steering angle even if an error occurs in steering angle information.

In addition, the present disclosure may provide a steering control device and control method for a vehicle capable of reducing errors occurring in positions of a steering wheel and a rack.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device of a vehicle comprising:
   memory configured to store instructions that are executable; and
   one or more processors configured to execute one or more of the instructions to perform operations comprising:
   receiving absolute steering angle information, relative steering angle information, and rack position information of the vehicle;
   determining absolute steering angle estimation information based on the rack position information and the relative steering angle information if there is an abnormality in the absolute steering angle information; and
   if an adjustment condition is satisfied for at least one of a rack limit position and a steering wheel limit position, performing a position adjustment control based on the rack position information and the absolute steering angle estimation information,
   wherein the one or more processors are configured to perform the position adjustment control moving both a steering wheel and a rack based on the rack position information and the absolute steering angle estimation information.

2. The steering control device of claim 1, wherein the one or more processors are further configured to receive steering wheel limit position indication information on whether a position of a steering wheel corresponds to the steering wheel limit position,
   wherein the adjustment condition comprises a condition in which it is determined that the position of the steering wheel corresponds to the steering wheel limit position based on the steering wheel limit position indication information,
   wherein the one or more processors are configured to, if the adjustment condition is satisfied, perform the position adjustment control to move a rack in a direction closer to the rack limit position.

3. The steering control device of claim 2, wherein the one or more processors are configured to:
   if it is determined that the absolute steering angle information corresponds to the steering wheel limit position and it is determined that the steering wheel limit position indication information does not correspond to the steering wheel limit position, re-determine the absolute steering angle estimation information within a range not exceeding the steering wheel limit position, and
   perform the position adjustment control to move the steering wheel in a direction closer to the steering wheel limit position.

4. The steering control device of claim 1, wherein the one or more processors are configured to determine steering angular velocity information based on the relative steering angle information, and determine a magnitude comparison result between the steering angular velocity information and a reference angular velocity,
   wherein the adjustment condition comprises a condition in which it is determined that the absolute steering angle estimation information corresponds to the steering wheel limit position.

5. The steering control device of claim 4, wherein the one or more processors are configured to, if the steering angular velocity information is greater than or equal to the reference angular velocity, re-determine the absolute steering angle estimation information within a range not exceeding a steering wheel limit position, and perform the position adjustment control to move the steering wheel in a direction closer to the steering wheel limit position.

6. The steering control device of claim 4, wherein the one or more processors are configured to, if the adjustment condition is satisfied and the steering angular velocity information is less than the reference angular velocity, perform the position adjustment control to move a rack in a direction closer to the rack limit position.

7. The steering control device of claim 1, wherein the adjustment condition comprises a condition in which it is determined that the rack position information corresponds to the rack limit position,
   wherein the one or more processors are configured to, if the adjustment condition is satisfied, perform the position adjustment control to move a steering wheel in a direction closer to the steering wheel limit position.

8. The steering control device of claim 1, wherein the one or more processors are further configured to receive at least one of steering motor position information received from a steering motor position sensor and steering torque information received from a steering torque sensor, and determine the relative steering angle information based on at least one of the steering motor position information and the steering torque information.

9. The steering control device of claim 1, wherein the one or more processors are configured to determine deviation information about a deviation between the absolute steering angle information and the rack position information,
   wherein the adjustment condition comprises a condition in which the deviation information exceeds an allowable deviation.

10. The steering control device of claim 1, wherein the one or more processors are configured to determine the absolute steering angle estimation information by using an inverse kinematics algorithm based on the rack position information.

11. The steering control device of claim 1, wherein the one or more processors are configured to perform the position adjustment control by moving a steering wheel in a direction closer to a steering wheel limit position and moving a rack in a direction closer to a rack limit position based on the rack position information and the absolute steering angle estimation information.

12. A steering control method of a vehicle comprising:
receiving absolute steering angle information, relative steering angle information, and rack position information of the vehicle;
determining absolute steering angle estimation information based on the rack position information and the relative steering angle information if there is an abnormality in the absolute steering angle information; and
performing, if an adjustment condition is satisfied for at least one of a rack limit position and a steering wheel limit position, a position adjustment control based on the rack position information and the absolute steering angle estimation information,
wherein the performing of the position adjustment control comprises performing the position adjustment control moving both a steering wheel and a rack based on the rack position information and the absolute steering angle estimation information.

13. The steering control method of claim 12, wherein the receiving comprises further receiving steering wheel limit position indication information on whether a position of a steering wheel corresponds to the steering wheel limit position,
wherein the adjustment condition comprises a condition in which it is determined that the position of the steering wheel corresponds to the steering wheel limit position based on the steering wheel limit position indication information,
wherein, the performing comprises, if the adjustment condition is satisfied, performing the position adjustment control to move a rack in a direction closer to the rack limit position.

14. The steering control method of claim 12, wherein the determining comprises determining steering angular velocity information based on the relative steering angle information, and determining a magnitude comparison result between the steering angular velocity information and a reference angular velocity,
wherein the adjustment condition comprises a condition in which it is determined that the absolute steering angle estimation information corresponds to the steering wheel limit position.

15. The steering control method of claim 12, wherein the receiving comprises further receiving at least one of steering motor position information received from a steering motor position sensor and steering torque information received from a steering torque sensor,
wherein the determining comprises determining the relative steering angle information based on at least one of the steering motor position information and the steering torque information.

16. The steering control method of claim 12, wherein the adjustment condition comprises a condition in which it is determined that the rack position information corresponds to the rack limit position,
wherein the performing comprises, if the adjustment condition is satisfied, performing the position adjustment control to move a steering wheel in a direction closer to the steering wheel limit position.

17. The steering control method of claim 12, wherein the performing of the position adjustment control comprises performing the position adjustment control by moving a steering wheel in a direction closer to a steering wheel limit position and moving a rack in a direction closer to a rack limit position based on the rack position information and the absolute steering angle estimation information.

* * * * *